Oct. 16, 1951  H. W. TREVASKIS  2,571,311
FLUID PRESSURE CONTROL VALVE UNIT
Filed Aug. 24, 1948
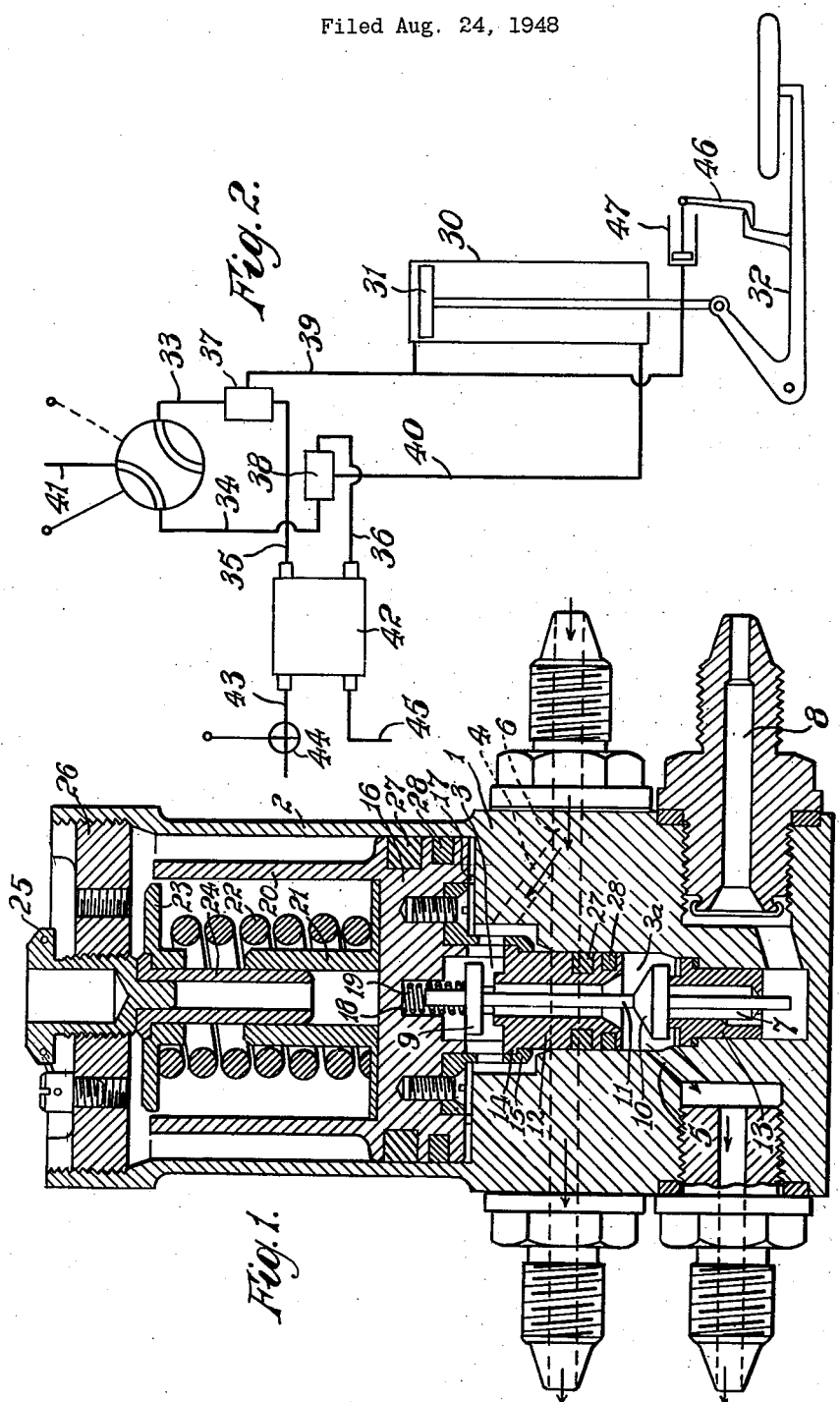
INVENTOR
Henry William Trevaskis
by Benj. T. Rauber
his attorney.

UNITED STATES PATENT OFFICE 2,571,311

FLUID PRESSURE CONTROL VALVE UNIT

Henry William Trevaskis, Solihull, England, assignor to Dunlop Rubber Company Limited, London, England, a British company Application August 24, 1948, Serial No. 45,915
In Great Britain August 22, 1947

5 Claims. (Cl. 137—153)

This invention relates to improvements in fluid pressure control valve units particularly for inclusion in systems for operating the undercarriages of aircraft.

It is usual to raise and lower the undercarriages of an aircraft by means of a two-way jack operated by fluid pressure. When the undercarriage is in its raised position, in which it is held by a catch, the piston of the jack is at one end of its stroke and operating fluid pressure fills the cylinder on the retracting side of the piston.

In order to lower the undercarriage the operating fluid in said portion is gradually released to exhaust and at the same time the catch is released and operating fluid is admitted to the other portion of the cylinder on the opposite side of the piston, so that lowering of the undercarriage takes place smoothly.

In the event of damage to the operating system, however, the fluid pressure on the retraction side of the piston may be lost, so that when the catch is released and operating fluid is admitted to the other side for the purpose of lowering the undercarriage there is substantially no resistance to the movement of the piston and the undercarriage may fall so rapidly under its own weight and the pressure of the operating fluid that it is seriously damaged or even broken.

It is an object of the present invention to provide a fluid pressure control valve unit suitable for use in a system for operating the undercarriages of aircraft whereby the undercarriage may be lowered smoothly despite damage to the fluid pressure line communicating with the retraction end of the jack cylinder.

According to the present invention a fluid pressure control valve unit comprises a housing having a fluid pressure chamber adapted to be connected to a source of fluid pressure and an operating chamber adapted to be connected to a fluid pressure operated mechanism and a valve adapted to close the opening between the said two chambers when the pressure in the pressure chamber exceeds a pre-determined value.

Valves of the above type are particularly designed for use in the operating systems of the present invention, but they are applicable in general where it is desired to allow a supply of fluid under pressure to flow to a chamber until a pre-determined pressure is reached and then to stop the supply.

The invention will now be more particularly described with reference to the valve and system shown diagrammatically in Figures 1 and 2 respectively of the accompanying drawings.

Figure 1 is a cross-sectional elevation of a valve which comprises a housing consisting of a cubical base portion 1, and a cylindrical extension 2. Centrally disposed in the base portion is a pressure chamber 3 and an operating chamber 3a from which lead conduits 4 and 5 respectively for connection to a source of pressure fluid and a fluid pressure operated mechanism. The base portion also contains a conduit 6 from which conduit 4 branches and which is adapted to provide a direct connection between a source of pressure fluid and a fluid operated mechanism.

The operating chamber communicates with an exhaust chamber 7, from which leads a conduit 8 for connection to exhaust.

The valve mechanism comprises an inlet valve 9 and an exhaust valve 10 carried on a common stem 11 and co-operating with valve seating elements 12 and 13 respectively. The inlet valve seating element is slidable within the pressure chamber and has a lip 14 engaging with a flanged member 15 screwed to a plunger 16 slidable within the extension 3, having a perforated annular rib 17 to maintain a clearance space between the plunger and the base portion 1 so that the gas pressure in the pressure chamber is operative over the whole of the lower surface of the plunger. In the base of plunger 16 is a central blind hole 18 forming a seating for one end of a compression spring 19 which surrounds the end of the stem 11 and bears on the inlet valve 9, thus holding the exhaust valve 10 against its seat.

The cylindrical extension 2 contains the plunger 16 referred to above, which has an extension 20 in the form of a skirt spaced from the walls of the extension. Within the skirt is a flanged guide 21 which locates a compression spring 22 the other end of which bears on a flanged ring 23 associated with a flanged tube 24 slidable in the guide 20. An adjusting screw 25 engaging in a screwed hole in a cover 26 and co-operating with the tube 23 provides means for adjusting the degree of compression of the spring 20.

Felt rings 27 and seal 28 are provided in the peripheries of the seating element 12 and member 16.

Figure 2 shows in diagrammatic form a pressure fluid operated system including a valve in accordance with the invention. The system comprises a double-acting jack 30 containing a piston 31 connected with an undercarriage 32. Main pressure fluid lines 33 and 34 and emergency pressure fluid lines 35 and 36 are connected to the ends of the jack cylinder through shuttle valves 37 and 38 and fluid lines 39 and 40.

A valve under the control of the pilot is provided for connecting either fluid line 33 or 34 with a source of pressure fluid through line 41 and the other line with exhaust.

In the emergency lines is a control valve 42, such as that illustrated in Figure 1, which is connected to a source of pressure fluid through the line 43 and valve 44. The line 35 is connected through the valve 42 directly to the line 43 and the line 36 through the pressure chamber of the valve to the line 43. The line 45 leads to exhaust and is connected to the exhaust chamber of the valve.

A catch 46 operated by piston and cylinder mechanism 47 connected to the line 39 is provided to lock the undercarriage in the retracting position.

In the event of damage to the main operating system resulting in loss of pressure on the retraction side of the piston 31 the pilot opens the valve 44 and pressure fluid then flows through the valve 42 into the lines 35 and 36 and through the shuttle valves 37 and 38 and lines 39 and 40 to both ends of the jack cylinder. Pressure fluid also flows from the line 39 to operate the catch mechanism 46 and release the undercarriage. As the pressure builds up in the retraction end of the cylinder the pressure in the pressure chamber 3 of the valve 42 also increases and urges the plunger 16 upwards against the spring 22. As the member rises it carries with it the inlet valve seating 12 and at a pre-determined pressure this engages with the inlet valve 9 and cuts off the flow of pressure fluid to the retraction end of the cylinder. Pressure fluid can, however, still flow to the lowering end of the cylinder and into the pressure chamber on the supply side of the inlet valve, so that the plunger continues to rise and lifts the exhaust valve 10 off its seat, thus placing the retraction end of the jack cylinder in connection with exhaust. The jack piston can thus move against a gradually decreasing pressure in the retraction end of the jack cylinder to lower the undercarriage.

An alternative means which may be employed in operating systems in accordance with the present invention comprises a closed chamber divided into two cells by a partition through which passes the stem of an inlet valve located in one of the cells and adapted to make a fluid-tight seal with a seating provided in the partition. The valve is urged against its seating by a compression spring surrounding the valve stem and located between the partition and the exhaust valve seating referred to below. The cell containing the inlet valve communicates through the fluid transmission line with the emergency source of pressure fluid.

The other cell, which communicates with the shuttle valve through the transmission line, contains an exhaust valve in the form of a plunger which is slidable in a fluid-tight seal in one end of the chamber and is provided with an exhaust passage extending from its base to the outside of the chamber. The base of the plunger is adapted to make a fluid-tight seal with a seating formed on the end of the inlet valve stem remote from the valve.

Also connected to the fluid transmission line and adjacent the chamber is a cylinder containing a piston having a rod extending through the end of the cylinder, said piston being normally urged away from said end by a helical compression spring encircling the rod and located between one face of the piston and the end of the cylinder.

Pivotally connected to the end of the rod exterior of the cylinder is a lever, one end of which pivots about a fixed point and the other end of which is pivotally connected to the plunger.

When the pilot opens the valve communicating with the source of pressure fluid, the fluid flows through the two cells to the retraction side of the jack piston and also direct to the lowering side of the piston. As the pressure on the retraction side builds up the helical spring is compressed and the movement of the associated piston rod and lever mechanism first closes the inlet valve and then opens the exhaust valve.

Having described my invention, what I claim is:

1. A fluid pressure control valve unit comprising a housing having a fluid pressure chamber adapted to be connected to a source of fluid pressure and an operating chamber adapted to be connected to a fluid pressure operated mechanism, co-axial inlet and outlet valves having a common valve stem, a movable seating element for the inlet valve said seating having an opening therethrough connecting the said pressure chamber to the said operating chamber, and a spring controlled plunger in the said pressure chamber adapted to move the said seating element when the pressure in the pressure chamber exceeds a predetermined value thereby closing the inlet valve and opening the outlet valve.

2. A fluid pressure control valve unit which comprises a housing, a conduit in said housing, means for connecting one end of said conduit to a source of pressure fluid and the other end to a fluid pressure operated mechanism, a fluid pressure chamber and an operating chamber within the housing, a movable inlet valve seating between the said chambers, a passage in said seating connecting said chambers, coaxial inlet and outlet valves having a common stem passing through said passage, a spring-loaded plunger responsive to fluid pressure in the pressure chamber and engaging with said seating to move said seating successively to close the inlet valve and to open the outlet valve when the pressure in the pressure chamber exceeds a predetermined value, means for connecting the fluid pressure chamber to a source of pressure fluid and means for connecting the operating chamber to a fluid pressure operated mechanism.

3. A fluid pressure control valve unit comprising a housing having a fluid pressure chamber adapted to be connected to a source of fluid pressure, an operating chamber to be connected to a fluid pressure operated mechanism, a passage connecting said chambers, an inlet valve to control flow of fluid through said passage, an exhaust valve to connect said operating chamber to exhaust and piston operated mechanism movable by increase in pressure in the pressure chamber to close the inlet valve when the pressure in said pressure chamber attains a predetermined value and to open the exhaust valve when said pressure exceeds said value.

4. A fluid pressure control valve unit comprising a housing having a fluid pressure chamber adapted to be connected to a source of fluid pressure, a member movable by the pressure in said pressure chamber, an operating chamber to be connected to a fluid pressure operated mechanism, a passage connecting said chambers, a valve operated by said movable member to close said passage when the pressure in the pressure chamber attains a predetermined value, an exhaust valve in said operating chamber operated by said movable member to open said exhaust valve when the pressure in the pressure chamber exceeds a predetermined value.

5. A fluid pressure control valve unit comprising a housing having a fluid pressure chamber, means for connecting said fluid pressure chamber to a source of fluid pressure, a member movable by the pressure in said pressure chamber, an operating chamber to be connected to a fluid pressure operated mechanism, a movable valve passage chamber connected to said movable member, an exhaust valve in said operating chamber, a valve positioned to close said movable passage when said movable member is moved by pressure in said pressure chamber beyond a predetermined value, said valve being connected to said exhaust valve to open said exhaust valve upon further movement of said movable member.

HENRY WILLIAM TREVASKIS.

REFERENCES CITED

The following references are of record in the file of this patent:

UNITED STATES PATENTS

| Number | Name | Date |
|---|---|---|
| 1,637,085 | Nichols | July 26, 1927 |
| 1,954,930 | Greenlee | Apr. 17, 1934 |
| 2,079,640 | Vickers | May 11, 1937 |
| 2,178,915 | McKee | Nov. 7, 1938 |
| 2,319,659 | Carnes | May 18, 1943 |
| 2,357,318 | Donaldson | Sept. 5, 1944 |